June 19, 1956

H. HOLZWARTH ET AL 2,750,736

EXPLOSION PLANT FOR GENERATING WORKING
GASES AND PROCESS FOR OPERATING SAME

Filed Dec. 24, 1951

INVENTORS.
**Hans Holzwarth
August H. Schilling**

BY *(signature)*

ATTORNEY

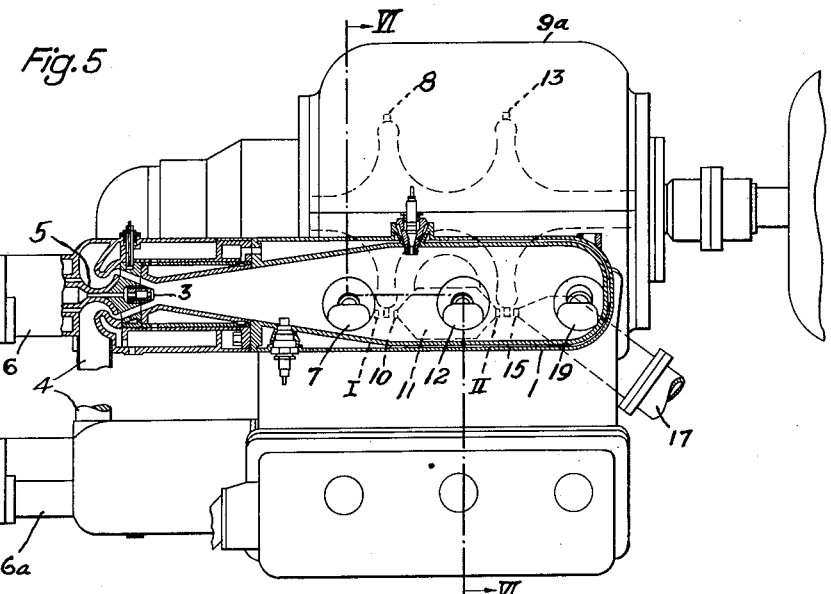
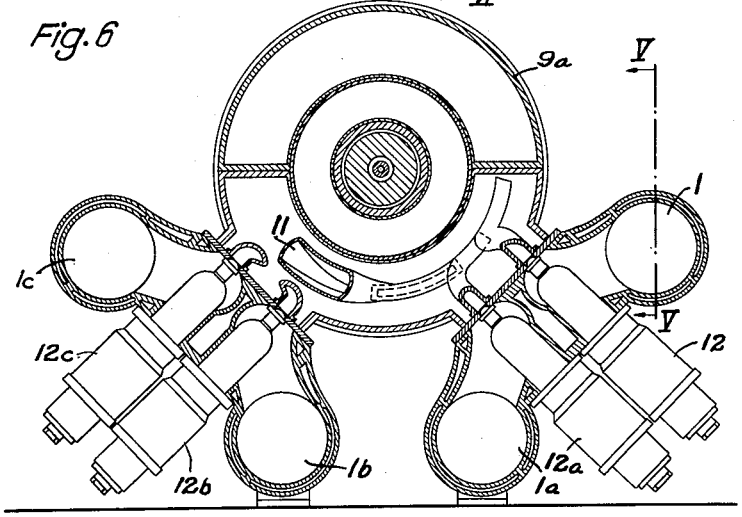

United States Patent Office 2,750,736
Patented June 19, 1956

2,750,736

EXPLOSION PLANT FOR GENERATING WORKING GASES AND PROCESS FOR OPERATING SAME

Hans Holzwarth, San Francisco, and August H. Schilling, Atherton, Calif., assignors to Schilling Estate Company, San Francisco, Calif., a corporation of California Application December 24, 1951, Serial No. 263,116

16 Claims. (Cl. 60—39.04)

The present invention relates to explosion turbine plants, and especially to explosion turbine plants for delivering pressure combustion gases after partial de-energization of the explosion gases in a plurality of turbine stages.

It is the general object of the present invention to provide an improved process and apparatus for the utilization of explosion gases generated at constant volume whereby high efficiency is attained with simultaneous simplification of the turbine structure.

It is a further object of the invention to provide an improved process for the utilization of the upper pressure and energy range of explosion gases produced under constant volume wherein the gases are partially de-energized in a series of single velocity stages with control of the pressure between the stages, that is, of the counterpressure acting against the nozzle and blading system of at least the first velocity stage and preferably also of at least one subsequent velocity stage, to the end that such counterpressures fluctuate synchronously with, and with the same characteristic as, the pressure drops in the preceding nozzle and blading aggregates, whereby substantially constant energy drops are obtained in at least one and preferably in a plurality of velocity stages.

More specifically, it is an object of the invention to provide an explosion turbine plant, suitable particularly for providing partially de-energized explosion gases for use outside such turbine plant, wherein the explosion gases are partially de-energized and in a plurality of velocity stages, each composed of a nozzle assembly and a rotor or wheel provided with only a single row of blading, so that the stationary reversing bladings are dispensed with.

It is a still further object of the invention to provide an explosion turbine rotor aggregate of the type above defined wherein a plurality of rotors or wheels are secured to or are constructed integrally with a common shaft which is hollow to provide for the passage of cooling agent for the rotors and the single rows of blading on the rotors, the rotors being disposed in a common housing, and there being provided a catch nozzle and a collector chamber within the housing and between at least the first two rotors for receiving gases which are to be charged against the single row of blading on the next rotor.

Other objects and advantages of the invention will become apparent as the more detailed description of the invention is presented hereinbelow.

In the technology of explosion turbines, especially those which are utilized for the manufacture of driving gases, it has heretofore been the practice in the designing of the plant to proceed from the process according to which the plant is to operate, usually one which has been recognized as advantageous, and to conform the devices for carrying out this process to such process, or to construct them to fit them for carrying out such process. This is particularly true for the construction of the turbine rotors and their rotating blading which heretofore simply had to be fitted to the energy drops resulting from the process and were so fitted. The effort was indeed made, especially as the energy drops increased with the rise of the pressures and temperatures, to facilitate this adaptation of the rotor construction to the energy drops by sub-dividing the generated combustion gases according to pressure or quantity, as well as to both pressure and quantity, but the limits of practical construction were very soon reached, which limits did not permit of any fundamental change of the rotor types available for utilizing the given drops. Corresponding to the energy drop conditions which were thus fixed from the start, there were generally employed Curtis wheels with two rows of blading, at least within the frame of the explosion turbine itself, whereas Parsons turbines could be resorted to for utilizing the driving gases exhausting from the explosion turbine section of the plant. This was made possible by the arrangement of pressure-equalizing chambers for equalizing the driving gases with regard to their pressure peaks and valleys, which gases were delivered to the explosion turbine section with strong pressure variations by the constant volume explosion chambers.

In practical constructions there were generally employed two two-ringed Curtis wheels, whereby the second Curtis wheel utilized the combustion gases which had first been conducted to the first turbine stage under the highest explosion pressure, whereupon they were caused to impinge the second Curtis wheel after subjecting them to the action of an intermediate pressure equalizing chamber. There was further arranged in advance of the second Curtis wheel a separate, second nozzle assembly which received the residual combustion gases expelled from the explosion chambers through a separately controlled discharge valve, usually called an outlet valve, by the action of the entering charge of air. This valve is to be distinguished from the discharge valve through which the higher pressure explosion gases escape to the first turbine stage, which is generally designated as a nozzle valve.

The present invention is based on the discovery that by the adaptation of the working process to given, already recognizedly advantageous constructional parts, it is possible to secure these advantages, and they become decisive when they form the basis for high efficiency. As one of these advantages, a high rotor efficiency may above all be mentioned. However, high rotor efficiencies can be attained only when the rotors or rotor groups are impinged by combustion gases of constant or practically constant drops. One can speak of practically constant drops when the maximum changes of the drop upwardly is 30% and downwardly is 15% of the optimum. In this way the most suitable wheel or group of wheels with the best efficiency can be selected, so that the explosion turbine is thereby lifted into the range of turbines with uniform drops, in contrast to which it possesses the advantage of a thermally better utilization of the driving medium.

However, this does not exhaust the requirements with regard to the type of working process. With the pressures and temperatures common today, and likewise with the properties of the construction materials available at the present time, it is possible with utilization of known expert measures, such as the use of building materials with a high proportion of nickel as well as of additional alloy components like chromium, molybdenum or the like, with application of blade and rotor cooling, especially blade foot cooling, and suitable rotor and rotor housing constructions, so to control the operating conditions of the rotor blades that such blades outlive without difficulty the usual life-span of this type of turbine. This, however, is not attainable to the same degree for the fixed guiding or reversing blades which are indispensable with rotors having two or more rows of blading and serve to direct and guide the combustion gas stream in the impingement of the second and subsequent rows of blading. It has been especially observed that the pause between impingements which obtains, in the case of a rotating blade, between the successive arrivals in front of the impinging nozzles, increases to a striking degree the life of the blade despite the fact that comparatively short periods are involved. On the other hand, the fixed reversing blades, especially in the case of continuous impingement, are always in the combustion gas stream, so that the favorable action of pauses between impingements does not appear. It is possible that, in addition to this periodic interruption in the impingement of the rotating blades, the ventilation effects of a rotor have a favorable action on the rotating blading in increasing their endurance against the high temperature stresses.

There is thus delineated the problem which was faced by the present invention. This problem, proceeding from the process for the operation of driving gas generators for the manufacture of combustion gases by explosion with utilization of the initial combustion gas drops in fixed nozzle and rotating blading aggregates, was solved in accordance with the invention by predetermining the pressure difference between the impingement pressures in advance of each blading and the counterpressures developed synchronously with such impingement pressures and likewise with similar characteristic, such counterpressures prevailing behind the respective nozzle and blading aggregates, viewed in the direction of gas flow, the partial drops thereby created being utilized in separate, single-ringed rotors with circumferential velocities of above 250 m./sec., preferably about 300 m./sec., and efficiencies between 75 and 85%.

The practice of our improved process leads to the above-mentioned advantage that by reason of the single row of blading on each of the rotors the reversing blading heretofore indispensable is entirely eliminated and with it the difficulties in operation which were heretofore experienced with such blading. Above all, however, there is obtained in accordance with the invention a rotor construction having a high efficiency, so that with the inherently high thermal efficiency of the explosion turbine, overall efficiencies are obtained which heretofore appeared unattainable. With a turbine having two separate stages the average temperature stresses on the rotors have values which can be completely and reliably controlled with the present-day construction of the rotors or rotor groups of the rotor chambers, and with known modes of cooling, without stressing the employed building materials too closely to the limit of their creep strengths.

In the preferred manner of carrying out the present invention there is utilized the feature described and claimed in the co-pending application of August H. Schilling, Serial No. 263,113, filed December 24, 1951, and entitled Apparatus for the Generation of Driving Gases by Explosion and Process for Operating the Same, according to which a counterpressure behind each of the turbine rotors is developed which is synchronous with and possesses a similar characteristic to the impingement pressure, whereby approximately constant energy drops are utilized in the turbine stages. In carrying out the present invention, therefore, it is necessary only to select equidistant or approximately equidistant intervals between the counterpressure lines and the associated expansion lines, in other words, to determine the position of the counterpressure line in the Q—V diagram in such manner as to obtain a circumferential rotor velocity of over 250 m./sec. and preferably of about 300 m./sec.; the observance of this requirement fixes the position of the counterpressure lines. As particularly suitable for this purpose there has proved the use of a Q—V diagram which corresponds to the usual Q—S entropy diagram, for example according to Pflaum, with the percentage of discharged combustion gas quantities, upon the basis of the total gas quantity generated per explosion as 100%, as abscissae, while the ordinates indicate the heat content of the combustion gases in Kcal./nm.$^3$. Such a diagram is illustrated in the drawing discussed below, in order to show how the counterpressure lines are to be determined in a two-stage turbine arrangement in order to be able to employ single-ringed rotors at the just mentioned circumferential speeds and at efficiencies of 75 to 85%.

The measures disclosed in the above-mentioned application for producing a counterpressure course which runs synchronously with and with similar characteristic to the associated expansion line, are characterized fundamentally by the fact that the counterpressure developed behind a blading, viewed in the direction of gas flow, is caused to fall during the period or nearly the whole period of expansion of the gases in the nozzle and blading aggregate in such manner that constant or practically constant combustion gas drops occur in the turbine stage under consideration. In particular, a fall of the counterpressure can be effected in which the line of the counterpressure in the already mentioned Q—V diagram runs equidistant or nearly so with reference to the expansion line. In view of the possibility of utilizing combustion gases produced by the explosion process itself for developing the counterpressure, the highest pressure portion of the combustion gases generated in an explosion chamber is brought into action upon the nozzle and blading system behind which a lower pressure gas portion of another chamber is utilized for producing a counterpressure during the expansion of the highest pressure gas portion of the first chamber in the nozzle and blading system. To this end, the working cycle sequence of a plurality of explosion chambers associated with the same nozzle and blading systems are displaced with respect to each other, in which chambers, during the period of expansion of gases discharged from one chamber in the nozzle and blading system, the gases discharging from another explosion chamber are utilized for producing the reduced counterpressure.

The further details of the process and apparatus for producing the equidistance above mentioned, or the practically uniform drops, are explained in connection with the constructional examples described below.

The devices for carrying out the process of the present invention are characterized by the fact that single rows of bladings are provided on at least two rotor arrangements, each nozzle assembly associated with the rotor arrangements being connected with at least one explosion chamber discharge valve. Rotors with two wheels on the rotor shaft each with a single ring of blades have proved to be especially advantageous. There is, of course, the possibility of utilizing rotors with more than two single-ringed wheels on the shaft. In such case, however, there is eliminated the advantage obtainable in the previously mentioned arrangement that the average temperatures which arise lead with the customary construction of the parts which come into consideration, to stresses which do not bring the employed building materials to the dangerous creep strength limit. In these cases, special constructions like intensified cooling, or the manufacture of the constructional elements of special high quality building materials must be used.

In carrying out our improved process it is important that the combustion-supporting air charged into the explosion chambers have a minimum pressure of about 5 ambient atmospheres. Thereby adequate pressure drops in the nozzles are provided, while at the same time an adequate minimum residual available energy content in the discharged gases for practical utilization is insured.

On the accompanying drawing there are shown three embodiments of the invention by way of example, the same being shown in the form of oil-driven driving gas generators with two and three turbine stages. In said drawing, Fig. 1 shows a driving gas generator operated with oil and having two turbine stages shown in vertical longitudinal section through the turbines and one of the explosion chambers;

Fig. 3 illustrates an oil-operated driving gas generator with a 3-stage turbine in longitudinal section; while

Fig. 5 shows a driving gas generator of the type illustrated in Fig. 1, but provided with four explosion chambers and represents an elevation, partly in section, taken along the line V—V of Fig. 6 and looking in the direction of the arrows; and Fig. 6 is a section taken along the line VI—VI of Fig. 5 and looking in the direction of the arrows.

Figure 1:
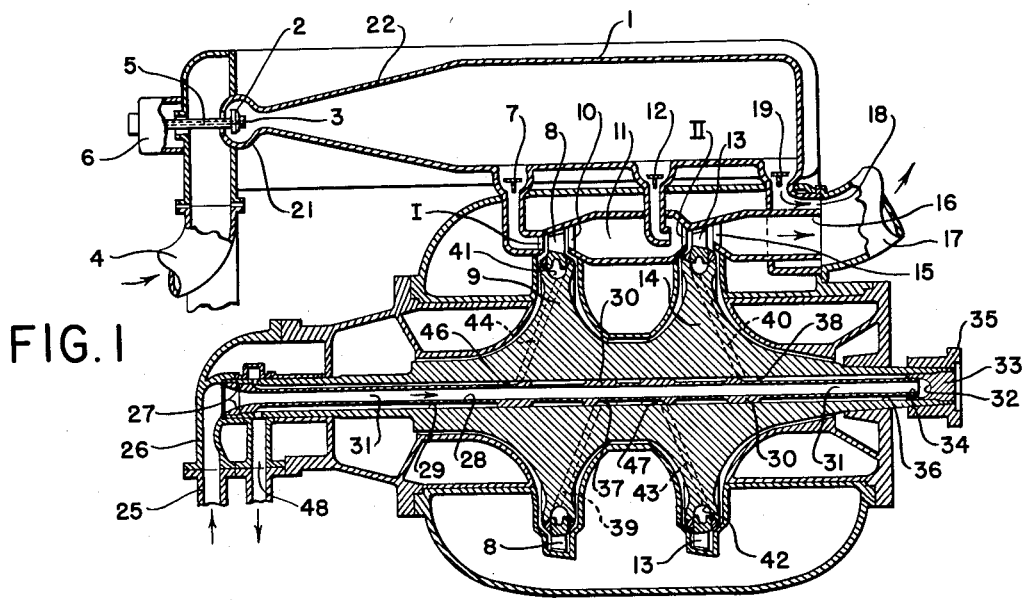

Referring to Fig. 1, the numeral 1 indicates one of the explosion chambers of the constant volume type which serve for generating the combustion or explosion gases. The chambers are equipped in the usual manner with charging air inlet valves 2 in which are incorporated the fuel injection valves 3. A charging air supply conduit 4 provides the air inlet members 2 with charging air, while fuel conduits 5 run from a fuel pump (not shown). The preferably hydraulic control mechanism of the valves 2 is indicated at 6. The explosion chambers are provided further with ignition devices of usual construction (not shown). Nozzle valves 7 discharge a combustion gas portion of highest pressure to the nozzle assembly I arranged in advance of the rotating blading 8 of the rotor 9 of the first turbine stage. A catch nozzle arrangement 10 receives the gases which have been partially de-energized in the first turbine stage I, 8, 9 and conducts them to a collector chamber 11 which, because of its small volume, can be disposed between the turbine stages. In addition to the nozzle valves 7 there are provided also the nozzle valves 12 by way of which the lower pressure combustion gas portions are discharged into the nozzle assembly II, the nozzle valves 12 being connected if desired directly with the collector chamber 11; however, they can also be arranged to discharge directly into the nozzle assembly II by by-passing the collector chamber 11, or they can be connected both with the collector chamber 11 as well as with special nozzles in advance of the blading 13. The nozzle assembly II is thus disposed in advance of the blading 13 of the rotor 14 of the second turbine stage II, 13, 14. The catch nozzle assembly 15 receives the gases which have flowed through the second turbine stage and conducts them into a pipe 16 which debouches into the driving gas withdrawal conduit 17. In the same plane of discharge a tubular connection 18 likewise opens which receives the residual combustion gases of the combustion chambers and discharges them into the conduit 17, such residual gases being expelled from the explosion chamber 1 by way of the opened outlet valve 19.

Figure 2:
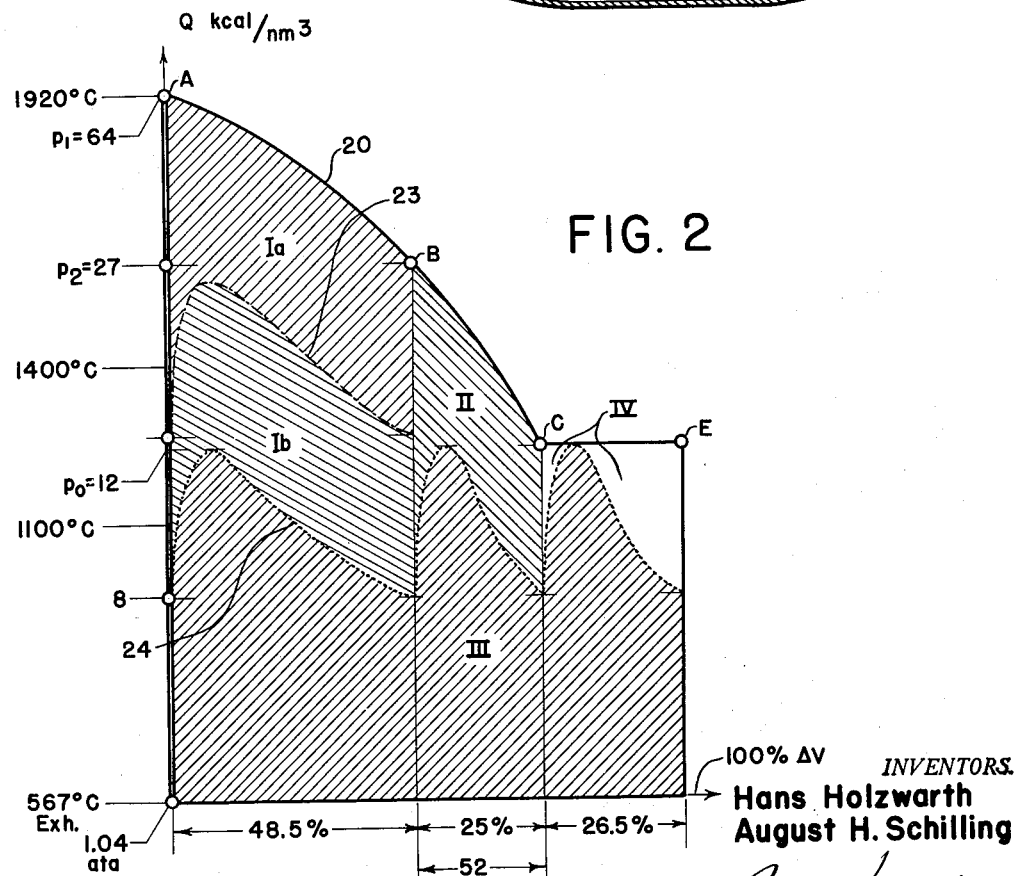
Fig. 2 shows the associated Q—V diagram.

The working process of the driving gas generator of Fig. 1 is represented in the Q—V diagram of Fig. 2. In such diagram there can be observed the combustion gas drops on the ordinate axis running from the point A, while the discharged combustion gas quantities can be measured on the abscissa axis in hundredths parts of the total quantity of combustion gases generated by each explosion in a chamber. The pressure and temperature line net-work is only indicated and is valid only for the double line running from the point A. The point A corresponds to the highest explosion pressure reached in the explosion chambers, such pressure being developed upon the ignition of a highly ignitable mixture of fuel and air in the explosion chambers. This maximum explosion pressure is designated as $p_1$, and in a practical embodiment of the invention can amount to about 64 atmospheres absolute (ata.) at a combustion gas temperature of about 1920° C. The drop characterized by the double lines is thus indicated by the distance of the point A from the coordinate starting point 0, whose condition is represented by the atmosphere line of 1.044 ata. at a combustion gas temperature of 567° C. This high initial drop of 522 kcal./nm.³ cannot be utilized with high efficiency by any single rotor or by any single rotor group, regardless of its construction; on the other hand this has been made possible in accordance with the invention by means of the turbine construction according to Fig. 1, and with the aid of the already mentioned constructional and process features which can be better understood from the diagram of Fig. 2, which will now be explained.

As shown in the diagram of Fig. 2 there is indicated on the expansion line 20 running from the point A, the point B which represents the instant in which the nozzle valve 7 closes, the same having been opened at the instant A for the discharge of a combustion gas portion whose initial condition is represented by the point A. At the instant B the nozzle valve 12 opens, all other valves of the explosion chamber being closed and remaining so, whereby a combustion gas portion is discharged whose initial condition is characterized by an intermediate pressure $p_2$ of about 27.7 ata. and a temperature of about 1400° C. corresponding to the point B. This lower pressure combustion gas portion of the initial pressure $p_2$ undergoes an expansion which follows the expansion line section B to C of the expansion line 20.

At the point C the nozzle valve 12 closes and the outlet valve 19 and the air charging valve 2 simultaneously open. The residual combustion gases in the explosion chamber 1 are then displaced by the incoming charge of air, beginning at the instant corresponding to the point C, so that the initial condition of the residual gases is indicated by the air charging pressure $p_0$ of 12 ata. and by a temperature of about 1100° C. corresponding to the point C, the two temperature values of about 1400° C. and 1100° C. being referred to the chambers of the rotors 9 and 14. At an instant corresponding to the point E of the diagram the valves 2 and 19 close simultaneously. The expulsion of the residual combustion gases by the charging air takes place with a minimum of mingling of gases and air by reason of the venturi nozzle-shaped inlet end of the explosion chamber which leads into a diffusor section 22, as a result of which the incoming charge of air assumes the form of a piston and pushes the residual gases before it. During the movement of the body of air within the explosion chamber, the plunger of the associated fuel pump has performed its speed stroke, so that fuel is injected by way of conduit 5 and injection valve 3 into the still moving air piston. The movement of the air piston thus contributes to the distribution of the fuel over the whole length of the chamber so that at the instant corresponding to the point E, the whole chamber 1 is filled with a homogeneous, highly ignitable mixture, whereby the chamber is prepared for carrying out a new working cycle which proceeds in the same manner as just described. The ignition which occurs shortly after the closing of the valves leads after the explosion to a condition of the explosion gases in the chamber which corresponds to the point A of Fig. 2.

It will be understood that the plant shown in Fig. 1 consists not only of the explosion chamber 1, but of additional chambers, preferably four in number or multiples of four (in which case, the chambers may be divided into four groups of two or more chambers each, operating in parallel). A 4-chamber plant is illustrated in Figs. 5 and 6 which show the four chambers disposed below the horizontal diameter of the rotor housing 9a, the additional chambers being designated by the reference characters 1a, 1b, and 1c, while the parts of such additional chambers corresponding to the parts of chamber 1 are designated with the same numerals, but with the corresponding letter attached. The working cycles of the four chambers are displaced in time with reference to each other, as explained more fully hereinbelow. The displacement is so determined that during the impingement period of the first turbine stage I, 9 by a combustion gas portion of the initial condition A of Fig. 2, another explosion chamber has provided the collector chamber 11, and by way of the nozzle valve 12, with a combustion gas portion whose initial condition would be represented by a point corresponding to the point B of Fig. 2, but in the (not illustrated) Q—V diagram of such second chamber. This provision of the collector chamber 11 with a combustion gas portion of initial condition B, in combination with the circumstance that the collector chamber simultaneously receives combustion gases by way of the catch nozzle arrangement 10, which latter gases have already given up a portion of their working capacity in the first turbine stage I, 8, 9, leads to the production of an internal pressure in the collector chamber and hence of a counterpressure acting on the preceding first turbine stage. The course of this counterpressure is represented in Fig. 2 by the dot-and-dash line 23. It will be seen that in consequence of the above-mentioned time-displacement of the working cycles of the several chambers, this counterpressure course 23 occurs substantially synchronously with the expansion line section A to B. It will be seen further that the lines 20 and 23 in the diagram section characterized by the working area Ia are completely equidistant except for the negligible filling phase 24, and as a whole run approximately equidistant to each other, it being possible to a large extent to reduce at will or even practically to eliminate the deviations in the region 24 by reduction of the size of the chamber 11 and by increase of the combustion gas portions conducted into the chamber 11 directly from the explosion chamber through valve 12. To keep the filling phase of negligible duration, we prefer to make the volume of the collector chamber 11 only about 1 to 10%, preferably 1 to 5%, of the combined volume of the explosion chambers associated with it, as described and claimed in the copending application of Rudolph Schilling and August H. Schilling, entitled "Process and Apparatus for Generating Driving Gases," Serial No. 263,115, filed December 24, 1951. The surface Ia represents the working capacity of the combustion gas portion which is brought into action through the nozzle assembly I in the first turbine stage 1, 8, 9.

In accordance with the invention, and as can be observed from Fig. 2, surface Ia in the Q—V diagram is determined by the line 20 representing the initial expansion in the explosion chamber, the line 23 representing the counterpressure in the collecting chambers 11, and on the sides by the ordinates through A and B. The horizontal distance between these two ordinates represents the magnitude of the volume of the combustion gases during this process, and is equal to about 48.5% of the total volume of the combustion gases discharged by a chamber during a complete cycle. The distance between the lines 20 and 23 is so chosen that a single ringed blading can be utilized in the first turbine stage and, as we have found, with an efficiency of between 75 and 85 percent.

What has been said hereinabove for the first turbine stage applies naturally also for the second turbine stage. The areas Ib and II represent simultaneously the working capacity of the combustion gas portion (48.5%) from nozzle assembly I and of the combustion gas portion (25%) from the second expansion of another explosion chamber. Area Ib is bounded by the lines 23, the counterpressure line in collecting chamber 11, the line 24, representing the counterpressure of space 15 and 17, and on the sides again the ordinates through A and B, determining the 48.5% volume, the combustion gas portion from nozzle assembly I. Jointly with Ib is brought into action the area II. It is bounded by the line B—C, the counterpressure line 24 in space 17, and on the sides by the ordinates through B and C, which are distant by 25% of the gas volume. Since line B—C runs very similarly to line 23, it is advantageous (as disclosed in the above-mentioned co-pending application Serial No. 263,115) to allow the 25% gases expanding along B—C to join with the 48.5% gases expanding along A—B in the collecting chamber 11 and leave that chamber jointly through nozzle assembly II, impinging upon wheel II. There is again the desired equidistance between the lines 23 and 24 for Ib and between the line B—C and 24 for II. As in the first stage, constant drops of enthalpy are obtained in the second turbine stage, and these drops are so chosen in accordance with the invention that also in the second turbine stage a single ringed blading is realizable with a peripheral speed of about 300 m./sec. and efficiencies of between 75 and 85%.

Simultaneously with the actions through nozzle assembly I on wheel 9 of a 48.5% combustion gas portion from explosion chamber 1 and of this 48.5% gas portion along with the 25% gas portion from another chamber impinging through nozzle assembly II on wheel 14, there comes into action a 26.5% gas portion from a third chamber, not yet specifically considered. This 26.5% gas portion represents the residual combustion gases in the third chamber after the expansion is terminated therein. These 26.5% combustion gases are pushed out from the third chamber through exhaust valve 19 into the conduit passage 17, leading to the power turbine, by means of the charging air under a constant pressure of $p_0 = 12$ ata., following the line C—E in the Q—V diagram. These gases expand down to the counterpressure in 17 represented by the line 24, the same pressure and temperature line also controlling the actions of the 48.5% gases from chamber 1 and of the 26.5% gases from the second chamber. Below these lines 24 lies the available working capacity of the gases in the power turbine reaching from ordinate A to ordinate E, covering 100% of the combustion gases and extending to the 1.04 ata. exhaust pressure line, and represented by area III. The expansion energy between line C—E and the counterpressure line 24 may be utilized, as described below, in connection with a third wheel of smaller diameter.

Even though the average temperature occurring during the process carried out pursuant to Fig. 2 is about 1400° in the first turbine stage, as is indicated by the temperature lines of such figure, and lead to blade stresses which can still be completely controlled, nevertheless the cooling of such blades and of the wheels and shaft must be very carefully accomplished in order to remain at a sufficient distance from the creep strength limit of the structural materials employed. As regards the rotor blades, the already known foot cooling thereof has proved to be especially advantageous. The passageways for supplying and withdrawing the cooling agent at the same time provide for an adequate cooling of the wheels. On the other hand, the cooling of the shaft has not heretofore been accomplished as thoroughly as is shown in the example of Fig. 1. The cooling agent enters the turbine rotor aggregate by way of the inlet tube 25 which, in the case of special cooling agents of high boiling point, leads from a re-cooling apparatus (not shown). The cooling agent enters the connection 26 and after passing through the trumpet-shaped chamber 27, flows through the interior 31 of a tube 28 disposed within a bore 29 in the turbine shaft, the tube 28 being provided with collars 30 which space it from the wall of the bore 29 and provide a plurality of spaced annular channels. The cooling agent, after traversing the interior of the central tube 28, passes into the hollow space 32 of the cap 33 and thence into the reversing channel 34 in such cap which at the same time serves as a closure for the bore 29. The annular space between the tube 28 and bore 29 at the right-hand end of Fig. 1 extends up to the coupling 35 of the turbine shaft for the output-absorbing machine or apparatus, the cap 33 being disposed in such coupling. The cooling agent then flows into the annular space 36 and thence into the reversing channels 37 and 38 between the collars 30. From the latter, it flows into the bores 39 and 40. The latter lead into the peripheral cooling channels 41 and 42 (at the outer circumference of the rotors) wherein they contact the feet of the blades 13 and 8. Thence the cooling agent flows into the return bores 43 and 44 in the bodies of the wheels 9 and 14 and then flows with a minimum of resistance into the reversing channels 37 and 46 located between the collars of the central tube 28. From the channel 46, the cooling agent flows into the discharge outlet 48 which leads, if desired, into a re-cooling apparatus whose discharge is connected with the tube 25.

In this way there occurs an effective cooling along the whole length and over all the constructional parts of the rotor including that of the wheels themselves and of the blading, which suffices completely to control and maintain without dangerous stresses and with safety and adequate life period of the stressed parts, the operating conditions shown in Fig. 2.

Figure 3:
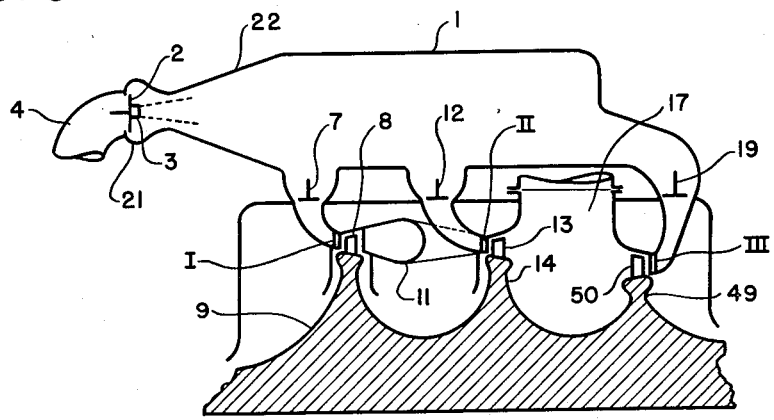
Figure 4:
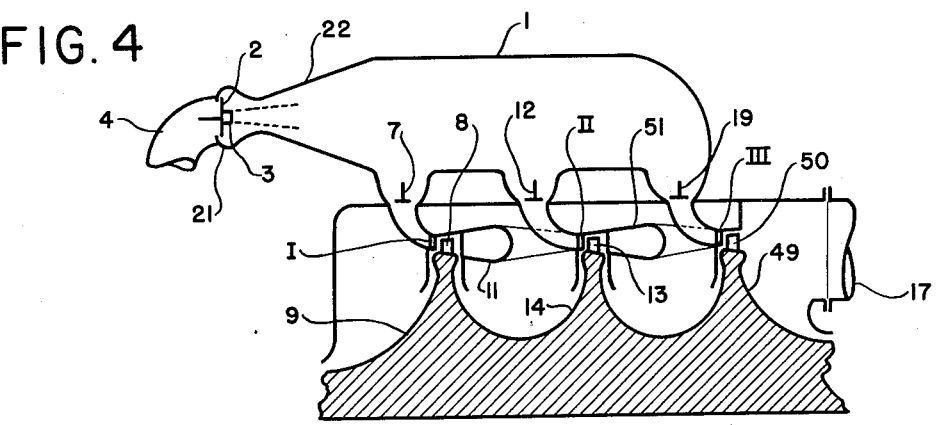
Fig. 4 shows a modification of the arrangement shown in Fig. 3, likewise in longitudinal section.

Modifications of the structure shown in Fig. 1 are illustrated in Figs. 3 and 4, wherein the same numerals have been employed to indicate corresponding parts. In the arrangement of Fig. 3, however, there is associated with the outlet valves 19 a special nozzle assembly III which in combination with the rotor 49 and the single ring of blading 50 form a third turbine stage. A similar third turbine stage is embodied in Fig. 4 with the difference that a second collector arrangement chamber 51 is provided which receives the gases which have been utilized both in the first turbine stage I, 8, 9 and in the second turbine stage II, 13, 14 and conducts them to the third turbine stage wherein they are caused to do further work along with the residual combustion gases discharged by the outlet valve 19 and whereupon all of the gases are discharged into the withdrawal conduit 17. As in the construction of Fig. 1, in connection with the collector chamber 11, the gases discharged by the outlet valve 19 of Fig. 4 can be directed into the collector chamber 51 instead of to the nozzle assembly III; in both cases, however, these gases operate to cause the counterpressure acting on the preceding turbine stage to fluctuate synchronously with the pressure in advance of such turbine stage to produce the substantially constant energy drop in such stage as explained hereinabove. In the construction of Fig. 3 the residual gases discharging from the third turbine stage III, 49, 50 similarly provide, although to a lesser extent, the fluctuating counterpressure for the second turbine stage, so that the energy drop in such stage during the successive impingements of the blading 13 is approximately constant.

It will be seen from the foregoing that we have provided an explosion turbine construction of greatly simplified form in that only a single row of blading is employed in each turbine stage, thereby eliminating the necessity for stationary reversing blades. Thereby the cost of such stationary blading is saved and at the same time the difficult problem of cooling them is eliminated. Moreover, by the discharge of the gases from the explosion chambers in a succession of portions of different average pressure, the velocity range of the gases expanded in the nozzles is reduced and the efficiency of the rotors correspondingly increased.

Where three or more turbine stages are employed, as in Figs. 3 and 4, the pressure drop available in the last turbine stage with the residual combustion gases discharged from the chambers through the outlet valves 19 by the incoming charge of air, may not be sufficient, when a relatively high pressure in the combustion gases delivered by the combustion turbine plant, for use elsewhere, is desired, to produce gas velocities in the last turbine stage of the order necessary to produce a blade velocity of over 250 m./sec., it will be desirable to reduce the diameter of such last turbine, as is shown in Fig. 3. By such variation, the energy of the gases charged to the last turbine blading will be utilized efficiently, and the gases will not act as a brake which might be the case if the last turbine rotor was of the same diameter as in the first two stages. By such arrangement each gas portion is utilized at the maximum efficiency, but in any event the first turbine rotor and preferably also the second, will be operated at the circumferential velocities disclosed hereinabove.

It will be understood that the illustrated apparatus includes valve control mechanism (not shown) of known construction, such as a hydraulic controller, for operating the several valves of each explosion chamber in proper timed relation with respect to each other and with respect to the corresponding valves of the other chambers. In particular, the valve control mechanism will be so designed as to operate the nozzle valves 7 and 12 and the outlet valve 19 in such timed relation that, as indicated in the Q—V diagram of Fig. 2, the energy drops in the different nozzle and blading aggregate, determined by the pressure of the combustion gas portions charged into the nozzles and the counterpressure acting thereon, will be such as to produce a circumferential blading velocity of above 250 m./sec., and preferably about 300 m./sec., so that a rotor efficiency of at least 75% will be insured. As the construction and design of such valve control mechanism is well understood in the art, we have not considered it to be necessary to illustrate the same in detail. Suitable valve timing and operating mechanisms are described, for example, in U. S. Patents Nos. 1,756,139, 1,763,154, 1,786,946, 1,933,385, 2,010,019, and 2,063,928.

We claim:

1. Process for the operation of driving gas generators for producing combustion gases by explosion with prior utilization of combustion gas drops in fixed nozzle assemblies and rotating bladings, comprising generating explosion gases in a plurality of constant volume explosion chambers operating out of phase, discharging the explosion gases from each chamber in at least three successive portions of progressively diminishing initial pressures, expanding at least the first two of said gas portions and directing them against different rotors each having only a single row of blading, and regulating the differentials between the impingement pressures in advance of each blading and the counterpressures developed synchronously therewith and likewise with similar characteristic, both viewed in the direction of gas flow, so that the partial drops produce in said single rows of blading a circumferential speed above 250 m./sec., whereby rotor efficiencies between 75% and 85% are obtained.

2. Process for the operation of explosion turbines provided with a plurality of wheels each having only a single row of blading and each provided with a nozzle assembly for directing explosion gases against said blading, and a plurality of explosion chambers for generating explosion gases therein, said process comprising charging successive portions of the explosion gases generated in each chamber directly into the said nozzle assemblies and at such pressures with reference to the counterpressures acting on the individual nozzle and blading aggregates that said single-row bladings are driven at circumferential speeds above 250 m./sec., whereby rotor efficiencies of at least 75% are attained.

3. Process for the operation of driving gas generators for producing combustion gases by explosion with prior utilization of combustion gas drops in fixed nozzle assemblies and rotating bladings, comprising generating explosion gases in a plurality of constant volume explosion chambers operating out of phase, discharging the explosion gases from each chamber in at least three successive portions of progressively diminishing initial pressures, expanding at least the first two of said gas portions of each chamber in a single stage velocity wheel, and regulating the counterpressure acting on each velocity stage to produce circumferential velocities of at least 250 m./sec.

4. Process according to claim 3, wherein the second and subsequent gas portions of any chamber are each discharged simultaneously with the discharge, in each case, of a next earlier portion from another chamber and are caused to produce a counterpressure acting against said earlier portion in the stage into which it is charged and fluctuating synchronously with the fall of pressure of said earlier portion and with similar characteristic.

5. Apparatus for the production of driving gases, comprising a plurality of constant volume explosion chambers, a plurality of rotors each provided with only a single row of blading, means including nozzles for charging into said rotor bladings the gases generated in said chambers, and means for maintaining behind each blading a counterpressure which fluctuates synchronously and with substantially the same characteristic as the pressure drop in each nozzle and blading aggregate in order to maintain a substantially constant enthalpy drop in the bladings throughout at least a large portion of the duration of a gas discharge from each chamber.

6. Apparatus according to claim 5, wherein each explosion chamber is provided with a plurality of discharge valves for discharging explosion gases in successive portions of progressively diminishing initial pressures, and means for operating said discharge valves in such timed relation that the working cycles of the chambers are out of phase, said last mentioned means being constructed and timed to open the discharge valves of each chamber at such instants that the energy drops in the individual nozzle and blading aggregates are sufficient to produce circumferential blade velocities of over 250 m./sec.

7. Apparatus according to claim 5, wherein each of the nozzles associated with a blading is directly connected with at least one discharge valve for explosion gases.

8. Apparatus according to claim 5, wherein two rotors are secured to a common shaft.

9. Apparatus according to claim 5, wherein more than two rotors are secured to a common shaft.

10. Apparatus for the production of driving gases, comprising a plurality of constant volume explosion chambers, a housing, a plurality of spaced rotors in said housing and each provided with only a single row of blading, a nozzle assembly for charging into the first rotor the gas portion of highest pressure from said explosion chambers, a catch nozzle and a collector chamber associated therewith and disposed in said housing between the first and second rotors, a nozzle assembly receiving the gases from said collector chamber, and means for directing to said last-mentioned nozzle assembly gas portions of lower pressure from said explosion chambers.

11. Apparatus according to claim 10, including a third rotor in said housing, and a catch nozzle and collector chamber in said housing between the second and third rotors and arranged to deliver gases to said third rotor.

12. Apparatus according to claim 10, including a third rotor in said housing which is of smaller diameter than the first two rotors, and means for directing gas portions of still lower pressure to said third rotor.

13. Apparatus according to claim 10, including a third rotor in said housing which is of smaller diameter than the first two rotors, and means for directing gas portions of still lower pressure to said third rotor and in an axial direction opposite to the flow of gases through the other rotors.

14. Apparatus according to claim 10, wherein the volume of the collector chamber is from 1 to 15% of the combined volume of the explosion chambers charging gases into the first nozzle assembly.

15. Apparatus according to claim 10, including a compressor driven by the rotors and constructed to deliver to the explosion chambers compressed air of a minimum pressure of about five ambient atmospheres.

16. Process according to claim 2, wherein the explosion chambers are charged with air of a minimum pressure of five ambient atmospheres.

References Cited in the file of this patent

UNITED STATES PATENTS

| | | |
|---|---|---|
| 1,931,545 | Holzwarth | Oct. 24, 1933 |
| 1,933,385 | Noack | Oct. 31, 1933 |
| 2,010,823 | Noack | Aug. 13, 1935 |
| 2,207,762 | Schmidt | July 16, 1940 |
| 2,461,239 | Schuster | Feb. 8, 1949 |
| 2,532,721 | Kalitinsky et al. | Dec. 5, 1950 |